United States Patent
Nedwed et al.

(10) Patent No.: US 9,663,914 B2
(45) Date of Patent: *May 30, 2017

(54) METHOD AND SYSTEM FOR OIL RELEASE MANAGEMENT

(71) Applicants: Timothy J. Nedwed, Houston, TX (US); Nicholas F. Urbanski, Katy, TX (US); Amy C. Tidwell, Houston, TX (US); Changyong Zhang, Conroe, TX (US)

(72) Inventors: Timothy J. Nedwed, Houston, TX (US); Nicholas F. Urbanski, Katy, TX (US); Amy C. Tidwell, Houston, TX (US); Changyong Zhang, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/514,251

(22) Filed: Oct. 14, 2014

(65) Prior Publication Data
US 2015/0144567 A1    May 28, 2015

Related U.S. Application Data

(60) Provisional application No. 61/909,194, filed on Nov. 26, 2013.

(51) Int. Cl.
*E02B 15/04* (2006.01)
*C02F 1/40* (2006.01)
(Continued)

(52) U.S. Cl.
CPC ............ *E02B 15/048* (2013.01); *B63B 35/32* (2013.01); *C02F 1/40* (2013.01); *E02B 15/042* (2013.01);
(Continued)

(58) Field of Classification Search
CPC .... E02B 15/042; E02B 15/047; E02B 15/048; E02B 15/0842; B63B 35/32; F23G 7/05; F23G 2207/103
(Continued)

(56) References Cited

U.S. PATENT DOCUMENTS 3,602,299 A * 8/1971 Mozic ................. E21B 43/0122
                                                              431/2
3,663,149 A    5/1972 Heagler
(Continued)

FOREIGN PATENT DOCUMENTS

WO    WO 2014/014656    1/2014

OTHER PUBLICATIONS

Belore, R.C. et al, "Air Jet Atomization and Burning of Oil Slicks," Proceedings of the Thirteenth Arctic and Marine Oilspill Program Technical Seminar, Jun. 6-8, 1990, Edmonton, Alberta, Environment Canada, Ottawa, Ontario, pp. 289-304.
(Continued)

*Primary Examiner* — Christopher Upton
(74) *Attorney, Agent, or Firm* — ExxonMobil Upstream Research Company Law Dept.

(57) ABSTRACT

Method and system is described for enhanced oil release management system by using one or more booms, one or more skimmers and one or more floating burners. The method and system may include skimmers to capture a fluid that is supplied to the floating burner.

24 Claims, 6 Drawing Sheets

(51) Int. Cl.
    *B63B 35/32* (2006.01)
    *F23G 7/05* (2006.01)
    *C02F 101/32* (2006.01)
    *E02B 15/08* (2006.01)

(52) U.S. Cl.
    CPC ............ *F23G 7/05* (2013.01); *C02F 2101/32* (2013.01); *E02B 15/0842* (2013.01)

(58) Field of Classification Search
    USPC ...... 210/747.6, 776, 170.05, 170.09, 170.11, 210/242.3, 923; 431/168
    See application file for complete search history.

(56) References Cited

U.S. PATENT DOCUMENTS

| | | | |
|---|---|---|---|
| 3,695,810 | A | 10/1972 | Heagler |
| 4,395,228 | A * | 7/1983 | Bazarov ................. F23D 11/06 431/168 |
| 4,576,569 | A | 3/1986 | Koblanski |
| 4,669,972 | A | 6/1987 | Koblanski |
| 5,057,004 | A * | 10/1991 | McAllister ............... F23G 7/05 210/923 |
| 5,328,353 | A * | 7/1994 | Keenan ................. E02B 15/042 210/922 |
| 5,409,607 | A | 4/1995 | Karlberg |
| 5,531,890 | A | 7/1996 | Keenan |
| 5,624,577 | A | 4/1997 | Wehrle et al. |
| 5,744,046 | A | 4/1998 | Dalmazzone et al. |
| 6,190,160 | B1 * | 2/2001 | Hibon ..................... F23L 7/007 431/10 |
| 8,366,439 | B2 * | 2/2013 | Ashline ................. E02B 15/042 431/14 |
| 9,320,931 | B2 * | 4/2016 | Nedwed ................ E02B 15/042 |
| 2003/0141113 | A1 | 7/2003 | Krill |
| 2011/0042323 | A1 | 2/2011 | Sullivan, II |
| 2012/0207544 | A1 | 8/2012 | Golden et al. |
| 2013/0153476 | A1 | 6/2013 | Sorstrom |
| 2013/0263766 | A1 | 10/2013 | Goruney et al. |
| 2015/0284925 | A1 * | 10/2015 | Nedwed ................ E02B 15/042 210/747.6 |

OTHER PUBLICATIONS

Buist, I.A. et al, "Subsea Containment: COOSRA Research to Date," Proceedings of the Fifth Arctic and Marine Oilspill Program Technical Seminar, Jun. 15-17, 1982, Edmonton, Alberta, Environment Canada, Ottawa, Ontario, pp. 129-150.

Caron, P., "Atomization Methods for Burning Oil Spills", McGill University, Apr. 1988, Montreal, Quebec, pp. 1-29.

Cooper, D. et al, "One-Step Offshore Collection and Removal: Combining an Oleophilic Skimmer and Floating Burner," AMOP Conference, Jun. 5, 2012, 14 pgs.

Franken, P. et al, "Combustive Management of Oil Spills," Final Report, University of Arizona, 1992, 59 pgs.

Koblanski, J.N., "An Acoustical Method of Burning and Collecting Oil Spills on Cold Open Water Surfaces," Proceedings of the 1983 Oil Spill Conference, Feb. 28-Mar. 3, 1983, pp. 25-28.

Lipski, C., "Study of In-Situ Combustion of Oil Spills," 1986, Environment Canada, Ottawa, Ontario, Report to the Environmental Emergencies Technology Division, 24, 36 pgs.

Nedwed, T. eta l., "One-Step Offshore Collection and Removal: Combining an Oleophilic Skimmer and Floating Burner," 32$^{nd}$ AMOP Technical Seminar on Environmental Contamination and Response, Vancouver, British Columbia, Jun. 5 to 7, 2012, 10 pgs.

Nordvik, .B. et al, "Mesoscale in Situ Burn Aeration Tests," MSRC Technical Report 95-017, 1995, Washington, D.C., 7 pgs.

Thompson, C.H. et al, "Combustion: An Oil Spill Mitigation Tool," Report for U.S. Department of Energy, Contract No. EY-76-C-Jun. 1830, 1979, U.S. Department of Energy, Washington, D.C., pp. 561-588.

Zhang, C. et al., "One-Step Offshore Oil Skim and Burn System for Use with Vessels of Opportunity," Clean Gulf Conference, Nov. 13, 2013, 5 pgs.

* cited by examiner

METHOD AND SYSTEM FOR OIL RELEASE MANAGEMENT

CROSS-REFERENCE TO RELATED APPLICATION

This application claims the benefit of U.S. Provisional Patent Application 61/909,194, filed Nov. 26, 2013, entitled METHOD AND SYSTEM FOR OIL RELEASE MANAGEMENT, the entirety of which is incorporated by reference herein.

BACKGROUND

This disclosure relates generally to the field of hydrocarbons operations. In particular, the disclosure relates to operations for managing oil releases.

This section is intended to introduce various aspects of the art, which may be associated with one or more embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In the oil and gas industry, hydrocarbons are accessed via a wellbore to provide a fluid flow path to a processing facility. Some of these hydrocarbon resources are located under bodies of water, such as lakes, seas, bays, rivers and/or oceans, while others are located at onshore locations. To transfer hydrocarbons from such locations, a pipeline and/or one or more different vessels (e.g., ship or tanker trucks) may be utilized through various segments from the wellbore and the processing facility.

Additionally, hydrocarbons may be transported from a production region to another region for consumption/processing into hydrocarbon-based products or from one hydrocarbon storage location to another. Transfer of hydrocarbons between such locations often requires one or more different vessels and routes over bodies of water, such as lakes, seas, bays, rivers and/or oceans.

Offshore leaks and/or spills from transfer operations may be problematic due to the hydrocarbons being released into a body of water. Typically, the hydrocarbons may form a slick on the surface of the water, which may be referred to as an oil slick. At the surface, the oil slicks are subjected to wind, waves and currents, which results in the oil slick being distributed over large geographic areas (also referred to as "weathering").

These oil slicks may be removed by mechanical and other oil release management techniques. As an example, typical oil release management techniques include in situ burning, oil collection techniques and/or other oil release management techniques. The in situ burning techniques typically utilize booms that are fire resistant to contain an oil slick. The in situ burning techniques typically include steps, such as containing the oil slick with booms, and igniting the captured oil. The burning of the oil produces large smoke pillars because the oil is not burned efficiently (e.g., portions of the fire being low in oxygen). Further, the inefficient burning results in residuals that may require further treatment.

Another oil release management technique is the oil collection technique. This technique typically involves steps, such as containing the oil slick with booms, utilizing skimmers with the booms to collect and capture the oil and then transporting the oil to an on-shore location or larger vessel for processing. As the oil slicks may be geographically dispersed, different size marine vessels may be utilized together, which may involve different oil management capabilities and coordination between the different marine vessels. Specifically, smaller marine vessels may be utilized to contain and collect the oil and larger marine vessels may be utilized to receive the oil collected by the smaller vessels, as well as contain, collect and process the oil. The coordination and operation of these different sized vessels and transport of the collected water and oil introduces inefficiencies into the operations.

Yet another oil release management technique involves the use of floating burners to dispose of the oil slick. For example, U.S. Pat. No. 3,695,810 describes a floating furnace that is used to burn oil residues and emulsions floating on a body of water. The furnace is described as including an insulating material that retains heat within the furnace. As another example, U.S. Pat. No. 3,663,149 describes a burner vessel that collects and burns oil floating on a body of water. The floating burners described in the aforementioned patent are capital expensive and fail to provide flexibility in operations.

As the management of hydrocarbon leaks and spills is a time consuming operation, a desire exists to enhance operations to manage hydrocarbon releases with enhanced methods and systems. In particular, a desire exists to enhance the collection and treatment of oil slicks in a more efficient manner. Further, a desire exists for enhancements to floating burners, such that the burning of the hydrocarbons in the oil slick is more efficient and results in less or no residue.

SUMMARY

This summary is meant to provide an introduction of the various embodiments further described herein and is not meant to limit the scope of claimed subject matter.

In one aspect, the present disclosure relates to a method for managing a hydrocarbon (e.g., oil) release with a skimmer and a floating burner. The method comprises: towing at least one boom, at least one floating burner and at least one skimmer from a marine vessel through a body of water; containing oil in the body of water within the at least one boom; capturing a fluid within the boom via the at least one skimmer; transferring the captured fluid to the at least one floating burner; atomizing the captured fluid; introducing a source of combustion air; and combusting at least a portion of the captured fluid in the presence of the combustion air via the at least one floating burner. The initial atomization of the captured fluid uses at least one mechanical atomizer.

In another aspect, embodiments disclosed herein relate to a system for managing an oil release. The system includes a marine vessel; at least one boom configured to be towed from the marine vessel and to contain oil within the boom when being towed; at least one skimmer configured to capture fluid; and at least one floating burner coupled to at least one skimmer. The at least one floating burner is configured to be towed from the marine vessel, receive the captured fluid from the at least one skimmer, atomize the captured fluid, introduce a source of combustion air, and combust the captured fluid. Initial atomization of the captured fluid uses at least one mechanical atomizer.

Other aspects of the present disclosure will be apparent from the following description and the appended claims.

DETAILED DESCRIPTION

Figure 1:
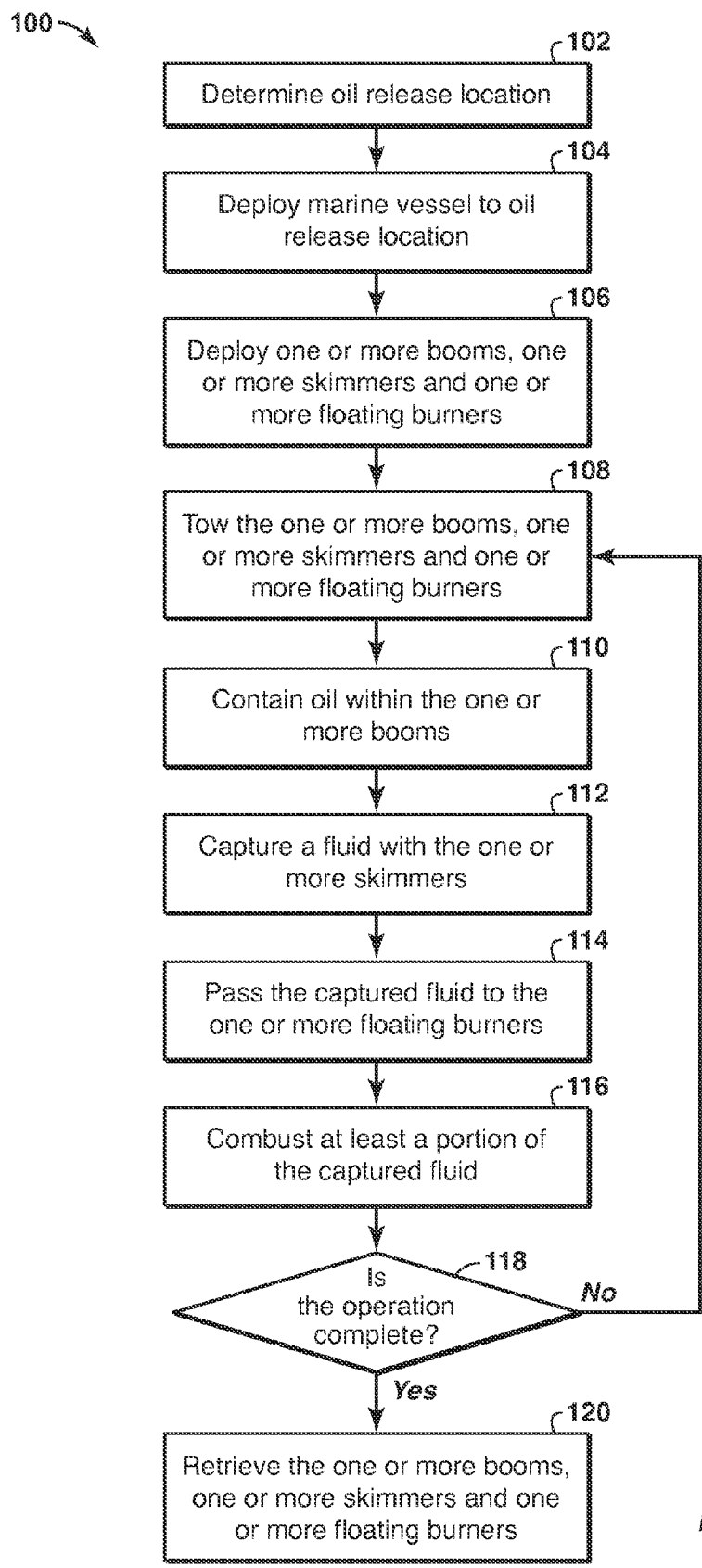
FIG. 1 is a flow chart for implementing a method for managing an oil release in accordance with one or more embodiments of the present disclosure.

In the following detailed description section, the specific embodiments of the present disclosure are described in connection with one or more embodiments. However, to the extent that the following description is specific to a particular embodiment or a particular use of the present disclosure, this is intended to be for exemplary purposes only and simply provides a description of the one or more embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

Certain terms are used throughout the following description and claims to refer to particular features or components. As one skilled in the art would appreciate, different persons may refer to the same feature or component by different names. This document does not intend to distinguish between components or features that differ in name only. The drawing figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, quantities, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of 1 to 4.5 should be interpreted to include not only the explicitly recited limits of 1 to 4.5, but also include individual numerals such as 2, 3, 4, and sub-ranges such as 1 to 3, 2 to 4, etc. The same principle applies to ranges reciting only one numerical value, such as "at most 4.5", which should be interpreted to include all of the above-recited values and ranges. Further, such an interpretation should apply regardless of the breadth of the range or the characteristic being described.

The term "mechanical atomizer" or "mechanical atomization" as used herein is meant to include atomizers which atomize the captured fluid through a mechanical mechanism and not through a separate source of atomizing fluid, for example atomizing fluids such as air, steam or the like used in air or steam atomizers. An atomizing fluid may be used as a secondary atomization mechanism, contacting the initially mechanically atomized captured fluid to further atomize the captured fluid.

The term, "combustible fluid(s)" as used herein may include any suitable combustible fluid such as methane, propane, diesel, gasoline, and/or marine fuel oil.

The term, "substantially the same" as used herein means to include variations of a given parameter or condition that one skilled in the pertinent art would understand is within a small degree variation, for example within acceptable manufacturing tolerances. Values for a given parameter or condition may be considered substantially the same if the values vary by less than 5 percent (%), less than 2.5%, or less than 1%.

The term "substantially different" as used herein means to include variations of a given parameter or condition that one skilled in the pertinent art would understand is not within a small degree of variation, for example outside of acceptable manufacturing tolerances. Values for a given parameter or condition may be considered substantially different if the values vary by greater than 1%, greater than 2.5%, or greater than 5%.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes an oil release management system and methods that include one or more booms and floating burners. As noted above, in situ burning of marine oil spills may be further complicated. For example, once the oil slick has weathered at sea for several days, the wind, waves, and currents tend to break a large slick into many smaller slicks. Tracking down and burning the small slicks are very inefficient when using fire-resistant booms to contain and thicken the oil so it can be ignited. Also, the smaller oil slicks may be distributed over large areas from the wind, waves, and currents, which further complicate the operations.

The oil release management system of the present disclosure may be utilized to perform in situ burning of an oil slick without the need for fire-resistant booms and allows deployment from any sized marine vessel, such as vessels of opportunity (e.g., fishing boats, shrimping boats, etc.) by utilizing skimmers combined with a floating burner. That is, the oil release management process may provide a one-step skim and burn system. Indeed, vessels of opportunity may become more effective oil spill responders because the number of vessels is larger compared to dedicated containment and recovery systems and the use of these vessels may eliminate the time-consuming and inefficient steps of storing, transferring, and disposing of recovered oil-water mixtures. The present techniques may utilize skimmers (e.g., properly operated oleophilic skimmer) that do not entrain much water, such that the recovered fluid can be immediately and effectively burned. As such, the present techniques may be utilized to in situ replace conventional booming and skimming operations.

Further, mechanical atomization allows for a compact design of the burner section while still providing the required capacity to burn the fluid captured by the skimmers, for example at least 20 barrels of oil per hour ("bph"), at least 30 bph, at least 35 bph or at least 40 bph. Burner sections using air atomization can be very large in size if they are to have the capacity to burn at least 20 barrels of oil per hour. For example, burner sections utilizing a reservoir cup containing oil therein and an air nozzle disposed within the reservoir cup to air atomize and combust the oil at a 20 bph capacity could require a housing (or stack) having a diameter of at least 2 meters ("m") (approximately 6 feet ("ft")) and a height of at least 6 m (approximately 20 ft). The conditions mentioned above can complicate collection of an oil slick, for example wind, waves, current, etc., can impact the stability of a floating burner. The size of burner sections using air atomization limits the conditions under which the burners may be deployed. However, the compact designs of the oil release management systems of the present disclosure allow such systems to be utilized under a greater range of conditions. Being able to respond under a greater range of conditions can allow for improved response time following the initiation of the oil release, and thus, limit the weathering of the oil spill resulting in improved physical oil recovery and decreased time to accomplish the recovery.

In one or more embodiments, the oil release management system may include a marine vessel that may be utilized to pull one or more booms, one or more skimmers and one or more floating burners. The booms may be utilized to contain the oil, while the skimmers may be utilized to capture the contained oil along with other fluids. The captured oil may be conveyed from the skimmer to the floating burner. This system may also include various measurement components (e.g., sensors), control devices (e.g., valves) and a process control unit, which are utilized to manage the process. The measurement components may monitor the amount of oil being collected, the hydrocarbon-to-air ratio in the burner, oxygen ($O_2$) levels, carbon dioxide ($CO_2$) levels and temperature, for example.

In one or more embodiments of the present disclosure, oleophilic skimmers may be utilized to enhance the oil release management process. While conventional skimmers are typically used in mechanical recovery processes that physically removes oil from the water surface and places it back in containment, oleophilic skimmers recover oil at higher rates than other skimmers, and capture much less water. That is, the oleophilic skimmer recovers roughly 90% oil and 10% water, whereas other conventional skimmers recover 10% oil and 90% water. Thus, oleophilic skimmers recover a fluid that may be directly utilized in a combustion process and efficiently burned, as opposed to conventional skimmers which provide a greater water content in the captured fluid and may require further treatment prior to being utilized in a combustion process. Also, oleophilic skimmers may be utilized to recover a broader range of oils, such as emulsified oils and/or oils having variable viscosities. Beneficially, the use of an oleophilic skimmer combined with a floating burner enhances the operation of the oil spill response process by providing removal of oil from the marine environment by the marine vessel that captures the oil. That is, a vessel of opportunity may be equipped with this oil release management system, which provides access to a large fleet of oil spill response vessels.

In one or more embodiments, the at least one floating burner may comprise a burner section and a floatation section coupled to the burner section and configured to maintain the burner section above the surface of a body of water. The burner section may include a support structure, a burner feed system; and an ignition source.

The burner feed system of the burner section includes at least one mechanical atomizer. In one or more embodiments, the mechanical atomizer may provide a hydraulic pressure drop across an orifice of a nozzle to mechanically atomize the captured fluid. In one or more embodiments, the mechanical atomizer may provide a centrifugal force generated by a rotary cup to mechanically atomize the captured fluid. In one or more embodiments, the at least one mechanical atomizer provides the primary atomization of the captured fluid. The atomized captured fluid may have any average droplet size suitable for combustion. In one or more embodiments, the atomized captured fluid may have an average droplet size after primary atomization of at most 10 millimeters ("mm"), at most 1 mm, at most 500 micrometers ("microns"), or at most 200 microns. The atomized captured fluid may have an average droplet size after primary atomization in the range of from 100 nanometers ("nm") to 10 mm, from 1 micron to 1 mm, from 10 microns to 500 microns, for example 25 microns, 50 microns, 75 microns, 100 microns, 125 microns, 150 microns, 200 microns, 250 microns, 275 microns, 300 microns, 350 microns, 400 microns, or 450 microns.

In one or more embodiments, the burner feed system includes a captured fluid injection line operatively connected to at least one atomization nozzle, which atomization nozzle is configured to atomize the captured fluid. The burner feed system may include at least one air source configured to mix air with the atomized captured fluid. In one or more embodiments, the air source may include at least one air injection line configured to provide air to the atomized captured fluid.

In one or more other embodiments, the burner feed system includes at least one rotary cup operatively connected to a captured fluid injection line and configured to atomize the captured fluid. The burner feed system may include at least one air source configured to mix air with the atomized captured fluid. In one or more embodiments, the air source may be provided by capturing wind within the housing from the environment.

In one or more embodiments, the oil release management system may include an air compressor and nozzle system that may be utilized to provide air for the combustion process. The air compressor may be utilized to provide compressed air to the burner section. The line operatively connecting the air compressor to the burner section may include a control valve. Air control valves may be controlled by a process control unit.

In one or more embodiments, the oil release management system may include a fan or blower to provide air within the housing for the combustion process. The fan or blower may be located within the housing or exterior of the housing. The fan or blower may provide a source of air to the burner section by a power operated fan or blower, air compressor-assisted fan or blower, naturally occurring wind, and/or air velocity created by towing the floating burner through the water. The ability to utilize sources of air other than compressed air in the rotary cup burner section designs may eliminate the requirement for having to have an air compressor or at a minimum reduce the size of air compressor required for the floating burner. In one or more embodiments, the oil release management system may include an air control system, for example dampers, louvers or other control mechanisms such as variable speed motors configured to control the speed of the fan or blower or variable fan blade pitch configured to control the air flow of the fan depending on the air system used to control the air flow. The damper, louver and/or other air control mechanism(s) may be controlled by a process control unit.

In one or more embodiments, the oil release management system may include one or more combustible fluid injection lines configured to provide one or more combustible fluids to the burner feed system of the burner section. In one or more embodiments, the one or more combustible fluid injection lines may be positioned within a support structure or exterior to the support structure. The one or more combustible fluid injection lines may be operatively connected to one or more combustible fluid storage tanks. The combustible fluid injection lines may include a control valve. Combustible fluid control valves may be controlled by a process control unit.

Embodiments of the present disclosure afford the floating burner the ability to provide air to the burner section in an efficient manner and to control the hydrocarbon-to-air ratio for optimum burn rates for the particular hydrocarbon fluid to be combusted. A proper hydrocarbon-to-air ratio for the floating burner may limit the production of black smoke and soot that may result from inefficient burning of the oil. Controlling the amount of air, captured fluid, and optionally combustible fluids, can achieve a proper hydrocarbon-to-air ratio and efficient burning of oil.

The floating burner may be configured to combust oil at rates that substantially match those recovered by one or more of the skimmers. The system may include measurement components, control units and a process control unit, as noted above, that manages the process in an enhanced manner to efficiently combust the recovered fluid (e.g., with less smoke emitted and minimal residue). In one or more embodiments, the oil release management system may include a heat exchanger to heat the captured fluid (e.g., oil and other captured fluids) prior to combustion. Various aspects of the present techniques are described further in FIGS. 1 to 8.

FIG. 1 is a flow chart 100 for implementing a method for managing an oil release in accordance with one or more embodiments of the present disclosure. This flow chart 100 includes a preparation and deployment stage, which includes blocks 102, 104 and 106, followed by an oil recovery stage, which includes blocks 108, 110, 112 114, 116 and 118, and followed by a retrieval stage, which includes block 120.

The process begins with the preparation and deployment stage, which determines the locations of an oil release and deploying the booms at those locations. At block 102, the oil release location is determined. The determination of the oil release location may include other vessels, such as airborne vessels (e.g., helicopter and/or airplanes) and/or other marine vessels that visually inspect the body of water for indications of an oil slick. The determination may also include modeling and/or designing a distribution for multiple marine vessels to cover certain regions of the body of water. Then, the marine vessel may be deployed to the oil release location, as shown in block 104. The marine vessel may be deployed by operating its motor to travel to the oil release location, be transported via another vessel. At block 106, the one or more booms, one or more skimmers, and one or more floating burners may be deployed from the marine vessel. This determination of the configuration of the one or more booms, one or more skimmers, and one or more floating burners along with any other equipment may depend on the thickness of the oil slick, the dimensions of the oil slick, and/or direction and magnitude of the current, wind or waves. Exemplary configurations are discussed further below in FIGS. 2 and 3. Also, the deployment may also include configuring one or more measurement components and/or a process control unit to manage the oil release management system.

After the preparation and deployment stage, the oil recovery stage is performed, as noted in blocks 108, 110, 112, 114, 116 and 118. At block 108, the marine vessel tows the one or more booms, one or more skimmers, and one or more floating burners deployed from the marine vessel. The speed of the towing and other variations may be adjusted subject to the deployed configuration and may depend on the thickness of the oil slick, the dimensions of the oil slick, and/or direction and magnitude of the current, wind or waves. At block 110, the oil is contained within the one or more booms. The oil, which is typically disposed at or near the surface of the water may be hindered from passing external to the containment region formed by the booms because of the boom structure and operation. Then, at block 112, fluid within the booms is captured by the one or more skimmers. The skimmers may include oleophilic skimmers, as noted above, and/or in certain embodiments may include weir or suction skimmers. The skimmers may include an oil-attracting material, which may include belts, disks, mop chains, brushes or the like that are utilized to remove oil from the surface of the body of water. The material utilized for the skimmer may include steel, aluminum, and general-use plastics, and the other suitable materials. The capturing of the fluid may include passing the oil attracting material (e.g., oleophilic material) through the body of water; moving the oil-attracting material from the body of water into a skimmer body or containment tank; and removing the captured fluid from the oil-attracting material (e.g., squeezing and/or scrapping the fluid from the oil-attracting material). The captured fluid may include emulsified fluid and/or a non-emulsified fluid. The captured fluid may have a composition of at least 50 volume percent hydrocarbons, at least 70 volume percent hydrocarbons, at least 80 volume percent hydrocarbons, at least 90 volume percent hydrocarbons, at least 95 volume percent hydrocarbons, or 99 volume percent hydrocarbons while the remaining fluid is predominately water (e.g., the composition of the fluid in the body of water, and/or more specifically the fluid of the oil slick in the body of water).

Once the fluid is captured, the captured fluid is then transferred to the one or more floating burners, as shown in block 114. The transferring of the captured fluid to the one or more burners may include pumping the fluid from the skimmer to the floating burner. The method may also include adjusting the hydrocarbon content of the captured fluid and/or the temperature of the captured fluid. For example, collected captured fluid may comprise emulsified oil. The emulsified oil may be subjected to in situ treatment with demulsifying0 fluid to reduce the emulsion water content to a combustible range. The process may include treating the captured fluid with a demulsifying fluid prior to transferring the captured fluid to the at least one floating burner. In particular, a demulsifying fluid may be combined with the captured fluid in the skimmer. In one or more embodiments, captured fluid having a high water content may be subjected to one or more separation processes to reduce the water content in the captured fluid prior to combustion, any suitable separation process may be used for example, a settling tank or heat-assisted separation which may use heat generated from the combustion process.

In one or more embodiments, the process may include heating the captured fluid through a heat exchanger prior to combustion. The heat exchanger may be a separate unit along the flow path of the captured fluid and/or may be integrated with the burner section. In one or more embodiments, the housing of the burner section may be configured to include a fluid passageway that maintains the captured fluid separate from the combustion products and utilizes the heat generated from the combustion process to heat the captured fluids. The fluid passageway may be interior and/or exterior of the housing. In one or more embodiments, the heat exchanger may be a separate unit and the heat may be provided by any suitable manner, for example an electric heater, thermal heat provided directly or indirectly from the combustion of the captured fluid, or the like. A heat exchanger may also be used to heat the captured fluid contained within a captured fluid storage tank, if a tank is used in the oil release management system. When using a heat exchanger, the captured fluid injection lines may be insulated to retain the heat imparted by the heat exchanger until the captured fluid is combusted.

At block 116, at least a portion of the captured fluid is combusted. The combustion of the captured fluid may include introducing air into the at least one floating burner and/or injecting one or more combustible fluids into the at least one floating burner. The combustion process may further manage the hydrocarbon-to-air ratio of the at least one floating burner, which may involve measuring the oxygen content of the at least one floating burner via an oxygen sensor, measuring the temperature of the at least one floating burner via a temperature sensor, measuring the carbon dioxide content of the at least one floating burner via a carbon dioxide sensor, adjusting the amount of air introduced into the at least one floating burner, and/or adjusting the amount of a combustible fluid introduced into the at least one floating burner. A determination may then be made whether the operation is complete, as shown in block 118. This determination may include visual inspection of the body of water within the boom, analyzing one or more samples from the body of water within the boom, and/or other operational concerns. If the operations are not complete, the process returns to block 108.

However, if the operations are complete, the one or more booms, one or more skimmers, and one or more floating burners are retrieved as shown in block 120. The retrieval of the one or more booms, one or more skimmers, and one or more floating burners may include recapturing the one or more booms, one or more skimmers, and one or more floating burners, cleaning the one or more booms, one or more skimmers, and one or more floating burners from any oil or other residues and transporting the one or more booms, one or more skimmers, and one or more floating burners to another marine vessel or on-shore location.

Beneficially, embodiments of the present disclosure provide flexibility and enhance the oil release management process. The system is compact and portable, which may be deployable from vessels of opportunity or other larger marine vessels. Accordingly, a large number of marine vessels may be deployed and utilized to address oil slicks (e.g., large oil spills that have degraded into many small slicks). Also, this compact and portable system can be deployed in a broad range of operating conditions, unlike air or steam atomization burner designs which have a much larger footprint for the same processing capacity which can result in stability concerns due to deployment conditions. This process does not require transporting captured oil from one vessel to another, delays from such operations and/or even the use of fire-resistant booms. Further, the floating burners provide greater control over the combustion process by minimizing the average droplet size of the atomized captured fluid through use of mechanical atomization.

Figure 2:
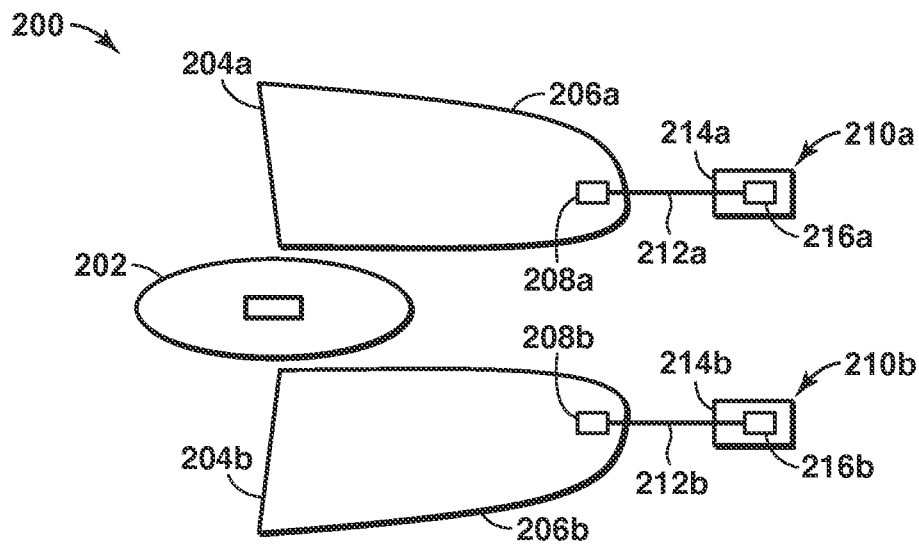
FIG. 2 is a diagram of an oil release management system in accordance with one or more embodiments of the present disclosure.
Figure 3:
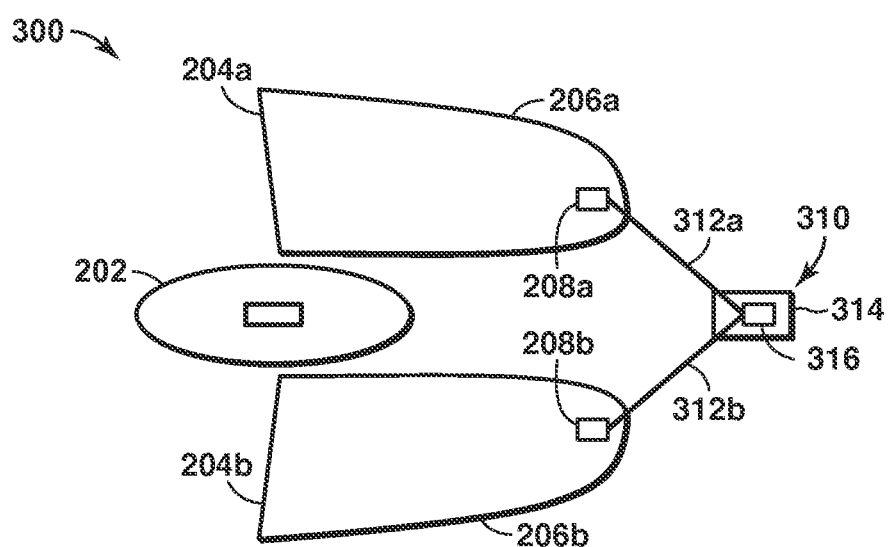
FIG. 3 is a diagram of another oil release management system in accordance with one or more embodiments of the present disclosure.

The specific operations of the method for managing an oil release may include various different configurations. Exemplary configurations of a marine vessel are shown in FIGS. 2 and 3. FIG. 2 is a diagram of an oil release management system 200 in accordance with one or more embodiments of the present disclosure. The oil release management system 200 may include a marine vessel 202 that has a first outrigger 204*a* and a second outrigger 204*b*. The marine vessel 202 may be a vessel of opportunity, such as fishing boat, shrimping boat and/or other suitable marine vessel. The marine vessel 202 may have a length greater than 15 feet, greater than 25 feet, greater than 35 feet and less than 120 feet, less than 110 feet, less than 90 feet, or less than 75 feet. In other embodiments, the marine vessel 202 may have a length greater than 15 feet, greater than 25 feet, greater than 35 feet, greater than 75 feet, greater than 90 feet, greater than 110 feet, or greater than 120 feet. The outriggers 204*a* and 204*b* may be securely fastened to the marine vessel 202 and extend from different sides of the marine vessel 202 over the body of water on opposite sides of the marine vessel 202. The outriggers 204*a* and 204*b* may be adjustable in length and/or angle to provide flexibility in the equipment being towed from the marine vessel 202. The marine vessel 202 may tow equipment via the outriggers 204*a* and 204*b*. In particular, the first outrigger 204*a* is utilized to tow the first boom 206*a*, the first skimmer 208*a*, the first captured fluid line 212*a*, and the first floating burner 210*a*, while the second outrigger 204*b* is utilized to tow the second boom 206*b*, the second skimmer 208*b*, the second captured fluid line 212*b*, and the second floating burner 210*b*.

The booms 206*a* and 206*b* may include various segments that are connected together to manage the hydrocarbons floating on the surface of the body of water (e.g., the oil slick). For example, the booms 206*a* and 206*b* may include a floating section that has a portion partially submerged in the water and a portion that extends out of the water, a skirt and ballast section that is located in the water, and/or may include an anchor section utilized to secure the boom in a relatively fixed location or a fixed orientation. The floating section is designed to maintain hydrocarbons from entraining over the boom, and the skirt and ballast section is designed to maintain hydrocarbons from entraining under the boom. The floating section and the skirt and ballast section are utilized to either contain or divert the hydrocarbons. The anchor section may include one or more anchors and associated lines to secure the anchors to the skirt and ballast section. If more than one boom is used, each boom may include these different sections.

The skimmers 208a and 208b may be utilized in one of the areas formed by the booms 206a and 206b, respectively. The skimmers 208a and 208b may be utilized to remove hydrocarbons (e.g., oil) floating on the surface of the body of water (e.g., the oil slick). For example, the skimmers 208a and 208b may include a housing, a storage tank, floatation member to maintain a portion of the skimmer above the surface of the body of water, captured fluid removal section and a motor. The motor is configured to move an oil-attracting material via belts, disks, mop chains, brushes or the like over or through the body of water, and through the captured fluid removal section, which is configured to remove the captured fluid from the oil-attracting material. The captured fluid may be contained in storage tank or vessel, which may be a portion of the skimmer housing. The skimmer may also include a pump, which is utilized to pump the captured fluid to another location, such as the floating burner or heat exchanger.

The floating burners 210a and 210b may be connected to one of the skimmers 208a and 208b via the captured fluid line 212a or 212b, which may be any line capable of transferring the captured fluid from the skimmer to the floating burner, for example pipe, flexible pipe, tubing, conduit, or the like. The floating burners 210a and 210b may each include a floatation section 214a or 214b and a burner section 216a or 216b. The floatation sections 214a and 214b are utilized to maintain the burner sections 216a and 216b above the surface of the body of water and may also be configured to maintain the stability of the burner sections 216a and 216b. In one or more embodiments, the floatation section may comprise a barge. In one or more embodiments, the floatation section may comprise a hull. The floatation section and burner section may be configured to functionally attach and detach (removable attachment) the burner section to the floatation section (e.g., a portable burner section) or may be configured to integrally mount the burner section to the floatation section (e.g., permanent or semi-permanent attachment). The additional components of the burner system may also be configured to functionally attach and detach to the floatation section or may be configured to be integrally mounted to the floatation section.

In one or more embodiments, the floatation section may include one or more propulsion devices. Such propulsion devices may include one or more of the following: propellers, impellers and/or jet thrusters. The one or more propellers and/or impellers may be included in screw-type propeller systems, azimuth thrusters or the like. In one or more embodiments, the propulsion device may be a component of a dynamic positioning system. The dynamic positioning system may include a computer control system to maintain position and heading using one or more propulsion devices. Position and heading may be maintained using one or more of the following: wind sensors, motion sensors, global positioning systems ("GPS"), gyro compasses, and propulsion devices. The computer control system may include one or more mathematical models and executable instructions configured to generate one or more signals to the propulsion devices to position the floating burner in the desired location. The positioning may be based on the absolute position of the floating burner locked to a fixed point or relative to a moving object such as the one or more vessels operating the oil release management system or one or more of the skimmers of the oil release management system.

Figure 4:
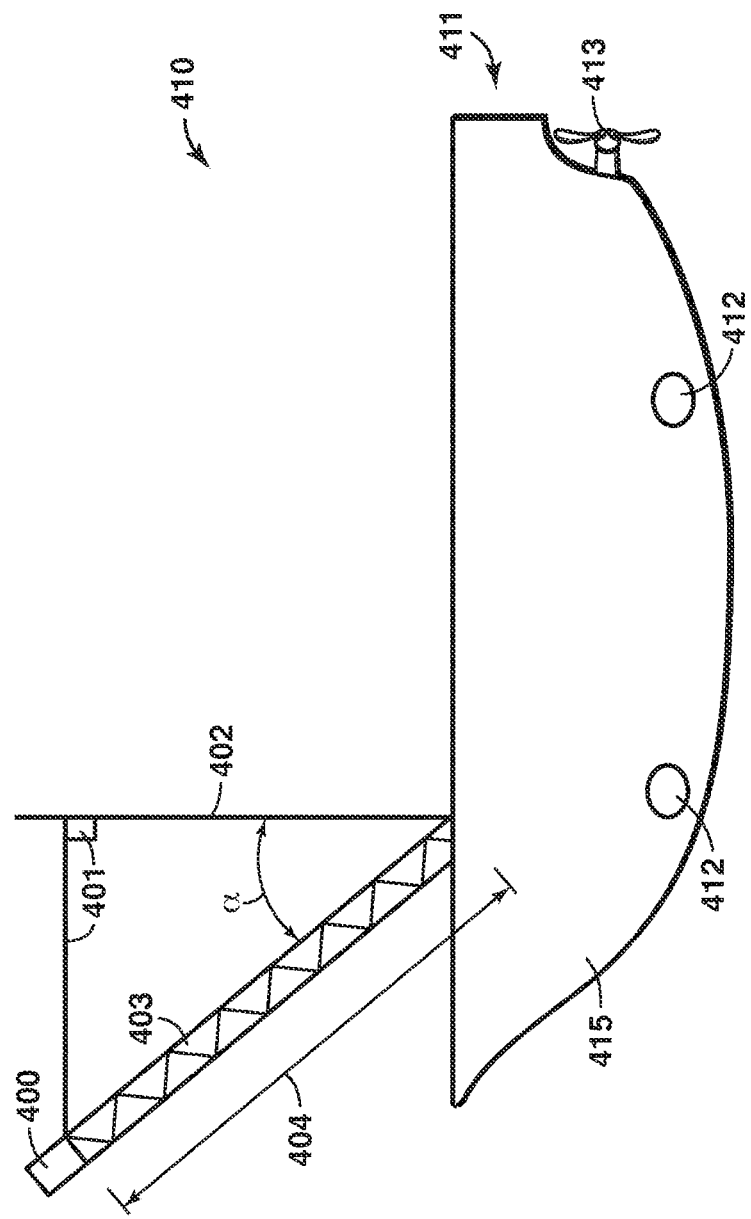
FIG. 4 is a diagram of a floatation section of a floating burner in accordance with one or more embodiments of the present disclosure.

FIG. 4 is a diagram of a floatation section 411 a floating burner 410 in accordance with one or more embodiments of the present disclosure. The floating burner 410 includes a floatation section 411 including a hull 415 and a propulsion system comprising a plurality of propulsion devices. The propulsion devices include a propeller 413 configured to provide forward and reverse movement to the floatation section 411 and a plurality thrusters 412. The propulsion system of FIG. 4 is a component of a dynamic positioning system as described above. The floating burner 410 includes a boom 403 and a burner section 400 mounted on the distal end of boom 403. A vertical post 402 (with respect to the floatation section) and a boom actuating mechanism 401 are configured to extend and retract the boom 403 to the vertical post 402. In one or more embodiments, the boom may form an angle (a) with respect to the vertical post in the range of from 0 degrees to 90 degrees, 25 degrees to 75 degrees or from 30 degrees to 60 degrees, for example substantially 45 degrees. Although depicted in FIG. 4 with respect to a hull, the boom system may be used with any floatation section. The boom may be of any suitable length. In one or more embodiments, the boom may be designed to have a length sufficient to minimize radiant heat absorbed by the floatation section while maintaining stability of the floatation section. In one or more embodiments, the boom may have a length of at least 10 ft (3 m), at least 15 ft (4.5 m), or at least 25 ft (7.5 m), as measured between the base of the boom and the burner section denoted as 404 in FIG. 4. In one or more embodiments, the boom may have a length of at most 60 ft (18 m), at most 50 ft (15 m), or at most 40 ft (12 m). The length of the boom may be determined in part based on the proposed oil combustion rates, for example a burn rate of 20 bph generates less radiant heat and therefore a shorter boom length may be used while a burn rate of 40 bph generates more radiant heat and therefore a longer boom length may be used. In one or more other embodiments, the burner section 400 may be configured to be mounted to the deck of hull 415. In one or more embodiments, an insulating material may be used to reduce the transfer of heat from the burner section to the deck of the hull when the burner section is mounted thereon. Additional components of the oil release management system, as described herein, may be positioned on the surface of the deck of the hull or below the deck of the hull. Using a hull for the floatation section, allows for enhanced floatability and maneuverability as well as added storage capacity as compared to using a barge as the floatation section. Enhanced floatability and maneuverability can allow the floating burner to be deployed in a broad range of operating conditions. The configuration of the burner sections 216a, 216b and 400 may include various different variations, and are described further below.

FIG. 3 is a diagram of another oil release management system 300 in accordance with one or more embodiments of the present disclosure. As the oil release management system 300 may include similar equipment as that used in the system of FIG. 2, the same reference numerals are utilized for simplicity. This system 300 is a variation in the configuration of the system 200 by using a single floating burner 310 to combust the captured fluid from the skimmers 208a and 208b. In this configuration, the single floating burner 310 may include a burner section 316 disposed on floatation section 314, which operates similar to the floating burners 210a and 210b, as noted above. However, in this configuration, the first captured fluid line 312a and the second captured fluid line 312b provide the captured fluid to the floating burner 310.

Beneficially, this system 300 configuration provides certain enhancements over other configurations. For example, the location of the floating burner may be positioned to be in the wake of the propellers of the propulsion devices from the marine vessel 202, which may reduce wave movement.

Further, this configuration also reduces expenses by utilizing a single floating burner to manage different captured fluids from different booms. Embodiments of the present disclosure can provide improved burn rates such that a single floating burner may support multiple marine vessels.

Figure 5:
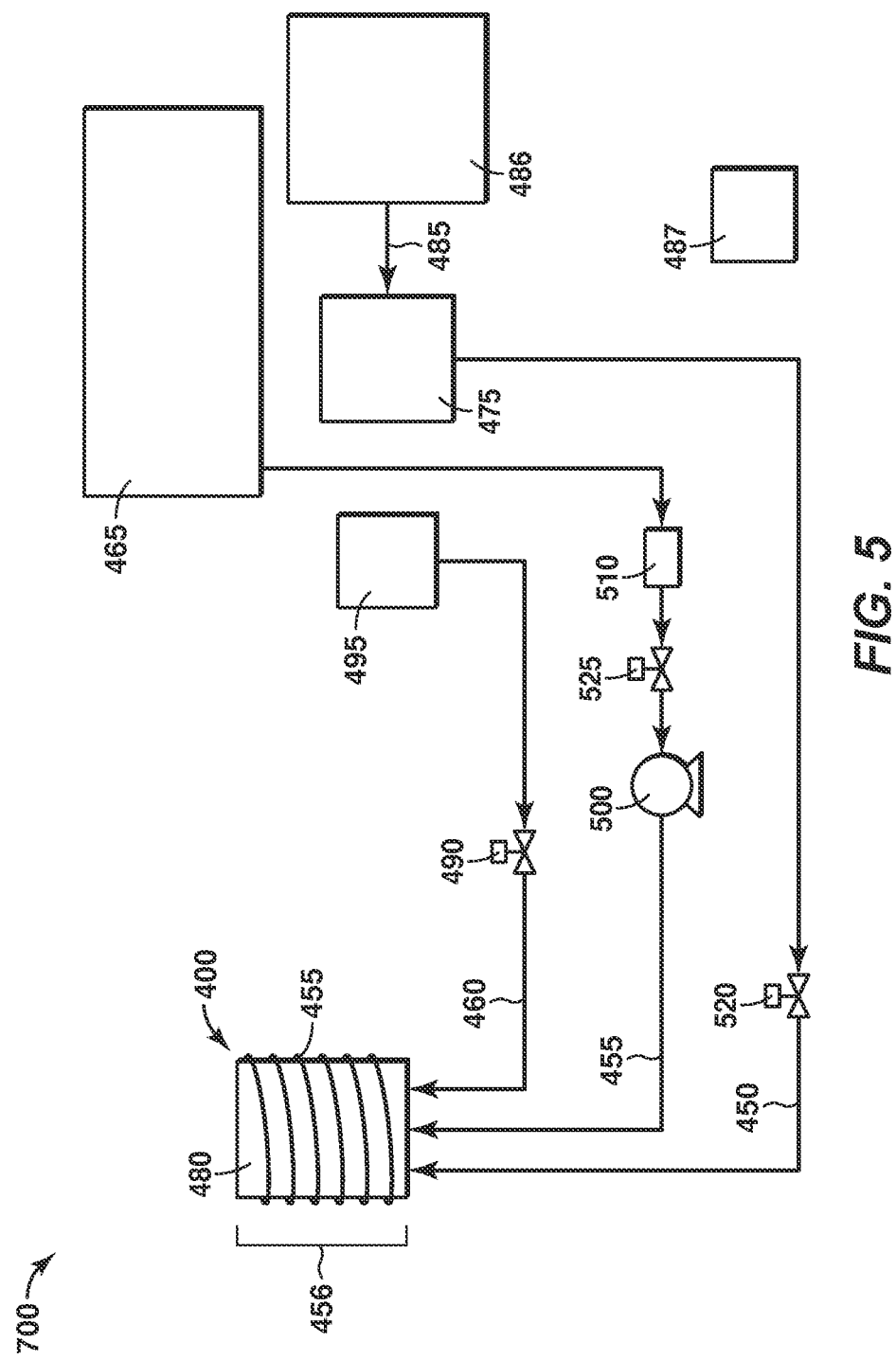
FIG. 5 is a diagram of a burner system in accordance with one or more embodiments of the present disclosure.

In addition, the oil release management systems may include additional equipment that may further enhance the process. FIG. 5 is a diagram of a burner system 700 in accordance with one or more embodiments of the present disclosure. For example, an air compressor 475 may be utilized with the burner section 400 to provide air to enhance the combustion process. Referring to FIGS. 2 to 4, the air compressor 475 may be located on the marine vessel 202 and/or may be disposed on the floating burners 210a, 210b, 310 and 410. The air compressor may provide air into the burner section housing 480 via one or more air injection lines 450. The air in the air injection line may be any suitable pressure, for example at a pressure in the range of 1 psig (7 kilopascal "kPa") to 100 psig (700 kPa) or in the range of 10 psig (70 kPa) to 50 psig (345 kPa). The air injection line 450 may include at least one air control valve 520, which air control valve 520 may be controlled by a process control unit. The air injection line 450 to the burner section may terminate with one or more nozzles or other air delivery mechanism to introduce the source of air into the burner section, for example a section of the air injection line proximate the captured fluid nozzle may have one or more opening or slots formed in the line (not shown) to introduce air. The nozzle or other air delivery mechanism may be integral with or separate from a mechanical atomizer.

In one or more embodiments, a heat exchanger may be utilized with the floating burners 210a, 210b, 310 and 410, skimmers 208a and 208b and captured fluid lines 212a, 212b, 312a and 312b to heat the captured fluid prior to being provided to the burner section 216a, 216b and 316. The heat exchanger may be included as one or more channels through the walls of the burner section housing 480 (not shown), one or more lines through the internal region formed by the burner section housing 480 (not shown), and/or one or more lines external to the burner section housing 480, depicted as 456 in FIG. 5. In one or more other embodiments, the heat exchanger may be located adjacent to the burner section housing 480. The heat exchanger may utilize diverted combustion products to heat the captured fluid prior to the burner section or utilize heat from the combustion process to heat a heat exchanger fluid to in turn heat the captured fluid prior to the burner section or utilize any other source of heat to preheat the captured fluid prior to the burner section.

In one or more embodiments, a generator 486 may be utilized with the floating burner to provide a source of electricity to the floating burners 210a, 210b, 310 and 410. For example, the generator 486 may provide electricity to the air compressor 475 via line 485. The generator 486 may be located on the marine vessel 202 and/or may be disposed on the floating burners 210a, 210b, 310 and 410.

Further, the oil release management systems may include additional equipment to manage the operation of the process. For example, the burner section 400 of the floating burner may include one or more injection lines 455 for the captured fluid. The captured fluid injection line 455 may transfer the captured fluid from a storage tank 465 or directly from a skimmer. The captured fluid storage tank 465 may be located on the marine vessel 202, skimmers 208a and 208b, or floating burners 210a, 210b, 310 and 410. The captured fluid storage tank may be configured to agitate or otherwise mix the captured fluid. When the captured fluid contains emulsified water, agitating or mixing the captured fluid in storage tanks may decrease any separation and reduce the amount of slugs of water reaching the burner section. In one or more embodiments, one or more emulsion additives may be added to ensure any water present in the captured fluid is in a mixture (e.g., an emulsion of oil and water) and minimizes formation of slugs of water within the captured fluid. The emulsion additive may be any suitable additive known in the industry. Slugs of water reaching the burner section if of sufficient quantity may extinguish the flame generated during combustion.

The captured fluid injection line 455 may also include at least one pump 500. The captured fluid injection line 455 may also include at least one filter 510 to remove one or more contaminants from the captured fluid prior to the burner section 400. In other embodiments, a strainer disposed within the inlet line to the pump 500 may be used to remove one or more contaminants from the captured fluid injection line. In one or more embodiments, multiple pumps may be used to transport the captured fluid to the burner section. The captured fluid injection line 455 may also include at least one captured fluid control valve 525, which captured fluid control valve 525 may be controlled by a process control unit. In one or more embodiments, the captured fluid injection line 455 may terminate in the burner section 400 with at least one nozzle having an orifice configured to mechanically atomize the captured fluid. The pump 500 and nozzle (not shown) at the end of the captured fluid injection line 455 create a pressure drop across an orifice in the nozzle to atomize the captured fluid in the absence of a source of high velocity air or steam. In one or more embodiments, the pressure within the captured fluid injection line and nozzle may be any suitable pressure, for example at least 5 psig (35 kPa), at least 10 psig (70 kPa), at least 85 psig (585 kPa), at least 100 psig (700 kPa), or at least 150 psig (1035 kPa). In one or more embodiments, the pressure within the captured fluid injection line and nozzle may be at most 400 psig (2760 kPa), at most 300 psig (2070 kPa), or at most 250 psig (1725 kPa).

Additionally, the oil release management systems may include a line 460 for the injection of a combustible fluid. The combustible fluid injection line 460 may transfer the combustible fluid from a storage tank 495. The combustible fluid storage tank 495 may be located on the marine vessel 202, skimmers 208a and 208b, or floating burners 210a, 210b, 310 and 410. The combustible fluid storage tank 495 may be pressurized. If storage tank 495 is not pressurized, the combustible fluid injection line 460 may include at least one pump (not shown) and at least one filter or strainer (not shown) to remove one or more contaminants from the combustible fluid prior to the burner section 400. The combustible fluid injection line 460 may also include at least one combustible fluid control valve 490, which combustible fluid control valve 490 may be controlled by a process control unit. In one or more embodiments, the combustible fluid injection line 460 may terminate in burner section 400 and be configured to deliver combustible fluid to the burner section separate from the captured fluid. In other embodiments, the combustible fluid injection line 460 may be configured to inject the combustible fluid into the captured fluid injection line 455 such that both the combustible fluid and the captured fluid may be delivered together for combustion.

Additionally, as discussed further herein, the oil release management systems may include communication components, process control units and control units collectively referred to as 487 in FIG. 5.

To manage the hydrocarbon-to-air ratio of the floating burner, one or more measurement components may be utilized along with a process control unit and control units. The measurement components may be utilized to measure the oxygen content of the floating burner via an oxygen sensor, measure the temperature of the floating burner via a temperature sensor; and/or measure the carbon dioxide content of the floating burner via a carbon dioxide sensor. The sensors may communicate the measurements to a process control unit that may provide a notification to an operator to adjust the amount of air, captured fluid and/or combustible fluid introduced into the floating burner and/or transmit a signal to a control device to adjust the amount of air, captured fluid and/or combustible fluid introduced into the floating burner.

In one or more embodiments, the floating burner may include a process control unit that may be utilized to manage the introduction of air, captured fluid and/or combustible fluid into the floating burner. The power components for the process control unit may include a generator, battery, wind, wave, and/or solar powered equipment. The different components or modules may be powered from the power component or may include separate power sources for each of the respective components or modules. Also, the different components and modules may also utilize a separate power source as a redundant power supply in certain embodiments.

The communication components may include communication equipment that is utilized with one or more antennas to communicate with one or more of measurement components or other process control units and/or internal components or modules. The communication equipment may utilize technologies, such as radio, cellular, wireless, microwave or satellite communication hardware and software. Also, the communication equipment may include and utilize any of a variety of known protocols to manage the exchange of information (e.g., Ethernet, TCP/IP, and the like). The communication equipment utilized may depend on the specific deployment locations and configuration. For example, if a measurement component and the process control unit are located in close proximity to each other, one form of communication may be utilized (e.g., wireless, radio, or physical connection), while for larger distances a second form of communication (e.g., satellite, or a different one from the first communication type of wireless and radio). In this manner, each measurement component and control unit may each include communication components that operate independently to communicate with the process control unit.

The measurement components may include various modules that provide information relating to operation of the floating burner. For example, the measurement components may include oxygen ($O_2$) and carbon dioxide ($CO_2$) sensors, flow meters, thermocouples and/or temperature sensors, for example. The measurement components may be configured to collect measurement data (e.g., amount of oil being collected, the hydrocarbon-to-air ratio in the burner, oxygen ($O_2$) levels, carbon dioxide ($CO_2$) levels and temperature) and transmit the measured data to the process control unit. These sensors may be disposed at various locations on the floating burner. For example, the thermocouples may be attached outside the burner section support structure and/or internal to the support structure to obtain measurement data. The measurement components may be configured to transmit information within a set time window (e.g., every 1 seconds, 5 seconds, 10 seconds, or even 30 second), transmit information when polled by the process control unit, or transmit information when a threshold has been reached or exceeded (e.g., monitored level is below or above a specified range or operational setting stored in memory).

The process control unit may include a processor, memory, communication components and a set of instructions stored in memory and accessible by the processor. The process control unit may be configured to communicate with the measurement components to obtain measurement data, communicate with control units to adjust flow rates, compare the measurement data to thresholds, calculate adjustments to the control units and communicate operational settings to the control units. Persons skilled in the technical field will readily recognize that in practical applications of the disclosed methodology of managing the operations, it is partially performed on a computer, typically a suitably programmed digital computer.

Certain embodiments of the process control unit, measurement components and control units may relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, components, features, attributes, methodologies, and other aspects of the present disclosure can be implemented as software, hardware, firmware or any combination of the three. Of course, wherever a component of the present disclosure is implemented as software, the component can be implemented as a stand-alone program, as part of a larger program, as a plurality of separate programs, as a statically or dynamically linked library, as a kernel loadable module, as a device driver, and/or in every and any other way known now or in the future to those of skill in the art of computer programming. Additionally, the present disclosure is in no way limited to implementation in any specific operating system or environment.

Further, one or more embodiments may include methods that are performed by executing one or more sets of instructions to perform modeling enhancements in various stages. For example, the method may include executing one or more sets of instructions to perform comparisons between thresholds current statuses or indications along with transmitting data between modules, components and/or sensors.

Figure 6:
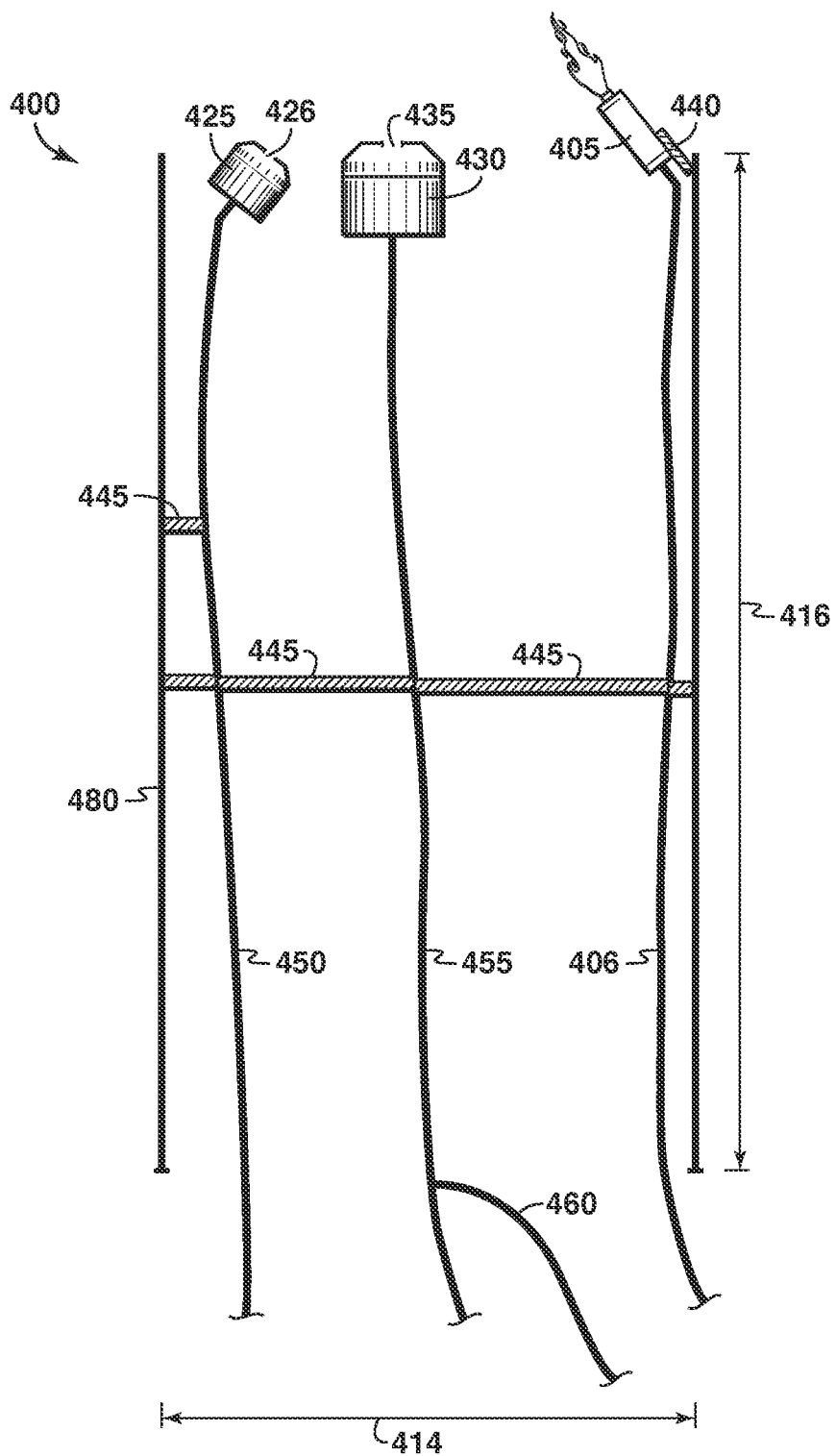
FIG. 6 is a diagram of a burner section in accordance with one or more embodiments of the present disclosure.
Figure 7:
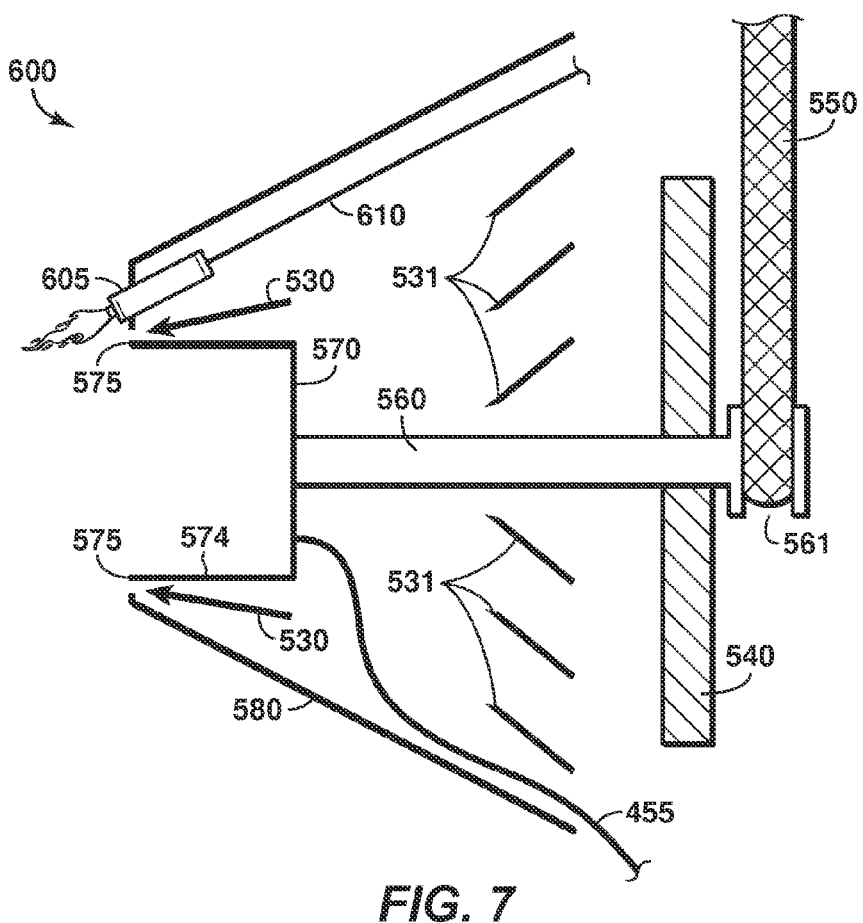
FIG. 7 is a diagram of a burner section in accordance with one or more embodiments of the present disclosure.
Figure 8:
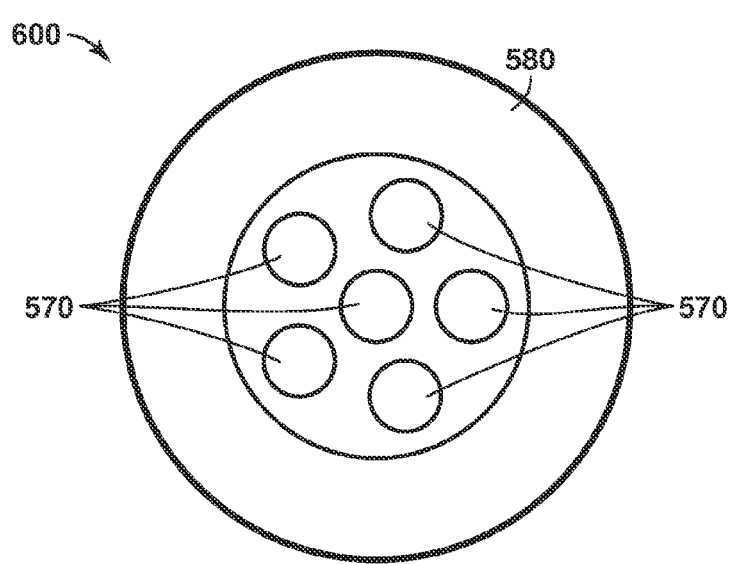
FIG. 8 is a diagram of a burner section in accordance with one or more embodiments of the present disclosure.

The specific configuration of the floating burner section may include various different configurations. Several configurations of the burner section are shown in FIGS. 6 to 8. FIG. 6 is a diagram of a burner section 400 in accordance with one or more embodiments of the present disclosure, in particular a flare burner. The burner section 400 may include burner section housing 480, an air injection line 450 and captured fluid injection line 455. The housing 480 may include a metal structure having an open internal region to provide control of the flame generated from the combustion of the captured fluid. The diameter of the housing 480, which is indicated by the line 414, may be any suitable diameter. In one or more embodiments, the diameter of the housing may be at most 70 inches (178 centimeters "cm") or in the range of 6 inches (15 cm) to 48 inches (122 cm), 12 inches (30 cm) to 36 inches (91 cm), for example 15 inches (38 cm), 18 inches (46 cm), 24 inches (61 cm), or 30 inches (76 cm). The height of the housing 480, which is indicated by the line 416, may be any suitable height. In one or more embodiments, the height of the housing may be at most 6 feet (1.8 meters "m") or in the range of 12 inches (0.3 m) to 5 feet (1.5 m), in the range of 18 inches (0.45 m) to 3 feet (1 m), for example 2 feet (0.6 m), 2.25 feet (0.7 m), 2.5 feet (0.8 m), 2.75 feet (0.9 m).

Although the support structure depicted in FIG. 6 is described as a housing having a metal structure with an open internal region, one skilled in the art would appreciate other configurations may be utilized as a support structure for the burner section. In one or more other embodiments, the support structure may be a post-like support structure having a diameter of 75% or less of the diameter of the flame (measured at the base of the flame proximate the mechanical atomizer), or a diameter of 50% or less, same basis. In one or more embodiments, the post-like support structure may have a plurality of arms or branches extending therefrom, the arms configured to at least provide the captured fluid and air for combustion. In one or more other embodiments, the support structure may be a skeletal structure configured to support, for example the burner feed system, ignition source, and measurement components. Any support structure utilized may be of any suitable cross-sectional geometry, for example circular, elliptical, oval, polygonal (triangle, square, rectangle, pentagon, hexagon, octagon, etc.).

Although the captured fluid injection line and air injection line are depicted in FIG. 6 as at least partially disposed within the housing, in one or more other embodiments, one or more of the captured fluid injection lines and/or one or more of the air injection lines may be positioned external of the housing or internal, external or combinations thereof to other support structures, for example to arms of a post-like support structure arrangement. In one or more embodiments, one or more of the captured fluid injection line, the air injection line, the combustible fluid injection line, the pilot gas injection line and the ignition source may be disposed external to the support structure. In one or more embodiments, such lines of the burner feed system may be spaced apart around the circumference of the axially upper end of the support structure. In one or more embodiments, the captured fluid may be provided through a centrally positioned mechanical atomizer (e.g., along the longitudinal axis of the burner section) and air may be provided circumferentially with respect to the central mechanical atomizer, for example a central captured fluid nozzle and a plurality of air nozzles circumferentially spaced around the central captured fluid nozzle either internal or external to the support structure.

Referring to FIG. 6, the captured fluid injection line 455 terminates with at least one mechanical atomizer which is depicted as nozzle 430. Nozzle 430 has an orifice 435 through which the captured fluid is passed. Nozzle 430 has a hydraulic pressure drop across orifice 435 which is configured to mechanically atomize the captured fluid. Any nozzle suitable for mechanically atomizing the captured fluid may be used. Nozzle 430 is at least partially disposed within housing 480 and is positioned at the axially upper end of housing 480. In one or more embodiments, a plurality of nozzles may be used to mechanically atomize the captured fluid, for example at least 2 nozzles, at least 3 nozzles, or at least 4 nozzles.

Still referring to FIG. 6, air injection line 450 terminates with at least one air nozzle 425. Air nozzle 425 has an orifice 426 and delivers a source of air for the combustion of the captured fluid. Nozzle 425 is at least partially disposed within housing 480 and is positioned at the axially upper end of housing 480. In one or more embodiments, a plurality of air nozzles (or other air delivery mechanism) may be used to deliver a source of air for combustion, for example at least 2 nozzles, at least 3 nozzles, or at least 4 nozzles.

FIG. 6 also depicts the introduction of a combustible fluid into the captured fluid. The combustible fluid is introduced into the captured fluid injection line 455 through combustible fluid injection line 460. This configuration may be beneficial when using a liquid combustible fluid. In one or more embodiments, a gaseous combustible fluid may be introduced into the captured fluid injection line or into the burner section separately from the captured fluid injection line. The gaseous combustible fluid may be introduced into the burner section through a separate injection line and may terminate with a nozzle or other gaseous delivery mechanism, for example a section of the injection line proximate the captured fluid nozzle having one or more openings or slots formed in the line (not shown). In one or more embodiments, air may be introduced into the captured fluid injection line through an air injection line.

Still referring to FIG. 6, an ignition source 405 is provided to ignite the captured fluid and maintain combustion. The ignition source has a pilot gas injection line 406 which is operatively connected to a pilot gas storage tank (not shown). The pilot gas injection line 406 may also include at least one pilot gas control valve (not shown), which pilot gas control valve may be controlled by a process control unit. The ignition source provides a flame to initiate or re-initiate combustion of the captured fluid. The ignition source may be a flame front generator, electronic spark ignition, or any other suitable ignition source. The power for the ignition source may be provided by a generator, battery, wind, wave, and/or solar powered equipment. The ignition source may also have one or more flame detection systems. The flame detection system may include one or more flame detection components which may be any suitable component configured to detect the presence or absence of a flame. In one or more embodiments, the flame detection components may include a thermocouple flame detection, flame ionization, optical scanning and/or acoustic monitoring. A feedback loop to a process control unit may be used to detect the presence or absence of a flame and to ignite a flame or re-ignite the flame if there is a disruption in the system. The pilot gas may be the same as the combustible fluid which may be used to enhance the hydrocarbon-to-air ratio or may be a different fluid. In one or more embodiments, the pilot gas may be methane or propane.

Still referring to FIG. 6, one or more radially interior support structures 445 may be provided within housing 480 to support captured fluid injection line 455, air injection line 450 and/or the pilot gas injection line 406. An ignition source support structure 440 secures the ignition source 405 to the burner section housing 480.

FIG. 7 is a diagram of a burner section 600 in accordance with one or more embodiments of the present disclosure, in particular a rotary cup burner (also referred to as a SAACKE burner). The burner section 600 may include burner section housing 580. The orientation for the burner section 600 is depicted as substantially zero degrees, determined by angle between the longitudinal axis of the rotary cup and a plane parallel to the surface of the earth. In one or more other embodiments, the orientation of the burner section may be in the range of from 0 to 90 degrees. Rotary cup 570 has an inlet for captured fluid injection line 455 and a shaft 560 to rotate rotary cup 570. In one or more embodiments, a distributor (not shown) may be used to feed the captured fluid into the rotary cup. Due to the different mechanical atomization mechanism of the rotary cup, pressure in the captured fluid injection line for delivering captured fluid to the rotary cup may be less than the pressure utilized with a nozzle system. The pressure in the captured fluid injection line may be any suitable pressure sufficient to provide the captured fluid to the rotary cup, for example at least 14.5 psig (100 kPa) or in the range of from 14.5 psig (100 kPa) to at most 72.5 psig (500 kPa), or at most 58 psig (400 kPa), or at most 43.5 psig (300 kPa). Rotary cup 570 may be rotated at a value of revolutions per minute ("RPM") adequate to provide a centrifugal force sufficient to form a film of captured fluid along the interior surface 574 of rotary cup 570 and to atomize the captured fluid as the fluid is released from rim 575 of rotary cup 570. The inner surface 574 and rim 575 are configured to provide the desired atomization of the captured fluid. The rotary cup may be any suitable shape sufficient to atomize the captured fluid, for example cylindrical or conical in shape when viewed in cross-section along the longitudinal axis of the cup. In one or more embodiments, the inner surface of the rotary cup may include one or more surface features, for example, ridges, grooves, dimples, bumps and the like. The end of the shaft 560 distal the rotary cup is provided with a groove 561 to accommodate a belt 550 which may be rotated by a motor (not shown). The rotary cup may be rotated at any suitable RPM sufficient to atomize the captured fluid. In one or more embodiments, the rotary cup may rotate at least 1000 RPMs, at least 2500 RPMs, at least 4000 RPMs.

Still referring to FIG. 7, fan 540 provides a source of air 530 to be introduced with the atomized captured fluid as it forms off rim 575 of rotary cup 570. Burner section 600 includes an air control system 531 to control the air flow 530 within the support structure, e.g., the housing. The air control system 531 may be controlled by a process control unit to modify the hydrocarbon-to-air ratio. Similar to FIG. 6, an ignition source 605 and pilot gas injection line 610 are also at least partially disposed within housing 580.

In one or more embodiments, the support structure, housing 580, of a rotary cup burner may be configured to circumferentially rotate about a mounting mechanism. The support structure may circumferentially rotate at least 90 degrees, at least 180 degrees or as much as 360 degrees. Circumferential rotation of housing 580 about a mounting mechanism allows the end of the housing distal the combustion zone to substantially align with a naturally occurring wind or wind generated from the one or more vessels towing the floating burner.

FIG. 8 is a diagram of a burner section 600 in accordance with one or more embodiments of the present disclosure, in particular a rotary cup burner using multiple rotary cups. Depicted in FIG. 8 is a burner section 600 including six rotary cups 570 within housing 580. Although six rotary cups are shown in FIG. 8, in one or more embodiments, at least two rotary cups may be used with a support structure, for example at least 6, at least 12, at least 15, or at least 20 rotary cups may be used. The plurality of rotary cups may be configured to rotate at substantially the same RPM or at substantially different RPMs. Each rotary cup may have its own motor for imparting rotation to the rotary cup or multiple rotary cups may share a motor for imparting rotation to the rotary cups. The use of multiple rotary cups allows for the use of smaller rotary cups which provides more surface area to the flame resulting in a hotter flame. The hotter flame can burn captured fluid more quickly boosting the combustion rate compared to using fewer larger rotary cups operated under similar conditions.

In one or more embodiments, the captured fluid injection line 455 may be a separate line coupled to the captured fluid line 212*a*, 212*b*, 312*a* and 312*b* or may be a portion of the captured fluid line 212*a*, 212*b*, 312*a* and 312*b*.

The skimmer and burner combination described herein has the ability to efficiently burn large quantities of oil removed from water surfaces (e.g., at least twenty barrels of oil per hour) without generating significant smoke plumes or residual oil. This concept may enable greater use of in situ burning for marine and freshwater oil spills.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method for managing an oil release, comprising: towing at least one boom, at least one floating burner and at least one oleophilic skimmer from a marine vessel through a body of water; containing oil in the body of water within the at least one boom; capturing a fluid within the boom via the at least one oleophilic skimmer; transferring the captured fluid via a captured fluid line to the at least one floating burner; atomizing the captured fluid using at least one mechanical atomizer; introducing a source of combustion air; and combusting at least a portion of the captured fluid in the presence of the combustion air via the at least one floating burner.

2. The method of claim 1, wherein the at least one mechanical atomizer provides the primary atomization of the captured fluid.

3. The method of claim 1, wherein atomizing the captured fluid uses a hydraulic pressure drop across an orifice of a nozzle.

4. The method of claim 1, wherein atomizing the captured fluid uses a centrifugal force generated by a rotary cup.

5. The method of claim 2, wherein the primary atomization has an average droplet size in the range of from about 100 nm to about 10 mm for the captured fluid.

6. The method of claim 1, wherein capturing the fluid within the boom via the at least one oleophilic skimmer comprises: passing an oil-attracting material through the body of water; moving the oil-attracting material from the body of water into a skimmer body; and removing the captured fluid from the oil-attracting, material.

7. The method of claim 6, wherein the captured fluid comprises at least 80 volume percent hydrocarbons.

8. The method of claim 6, wherein transferring the captured oil to the at least one floating burner comprises heating the captured oil prior to combusting the portion of the captured oil.

9. The method of claim 6, wherein introducing the source of air comprises injecting air from an air compressor into the at least one floating burner.

10. The method of claim 6, wherein introducing the source of air comprises introducing air directly from the environment into the at least one floating burner.

11. The method of claim 6, wherein combusting the captured fluid via the at least one floating burner comprises managing a hydrocarbon-to-air ratio of the at least one floating burner.

12. The method of claim 11, wherein managing the hydrocarbon-to-air ratio of the at least one floating burner comprises adjusting an amount of air and/or an amount of combustible fluid introduced into the at least one floating burner.

13. A system for managing an oil release, comprising: a marine vessel; at least one boom configured to be towed from the marine vessel and to contain oil within the boom when being towed; at least one oleophilic skimmer configured to capture fluid; and at least one floating burner coupled to the at least one oleophilic skimmer via a captured fluid line and configured to be towed from the marine vessel, receive the captured fluid from the at least one oleophilic skimmer via the captured fluid line, atomize the captured fluid using at least one mechanical atomizer, introduce a source of combustion air, and combust the captured fluid.

14. The system of claim 13, wherein the at least one mechanical atomizer provides the primary atomization of the captured fluid.

15. The system of claim 13, wherein the at least one mechanical atomizer comprises a nozzle configured to atomize the captured fluid.

16. The system of claim 13, wherein the at least one mechanical atomizer comprises at least one rotary cup configured to atomize the captured fluid.

17. The system of claim 16, wherein the at least one floating burner comprises a plurality of rotary cups configured to atomize the captured fluid.

18. The system of claim 14, wherein the atomized captured fluid has an average droplet size in the range of from about 100 nm to about 10 mm.

19. The system of claim 13, wherein the at least one floating burner comprises: a burner section that comprises: a housing; the at least one mechanical atomizer; a captured fluid injection line configured to provide captured fluid to the at least one mechanical atomizer; and an air injection line configured to introduce a source of combustion air to the atomized captured fluid; and a floatation section coupled to the burner section and configured to maintain the burner section above a surface of a body of water.

20. The system of claim 19, wherein the floatation section comprises a hull.

21. The system of claim 19, wherein the floatation section further comprises one or more propulsion devices.

22. The system of claim 13, wherein the system comprises one or more measurement components, communication components, process control units and/or control units configured to manage a hydrocarbon-to-air ratio of the at least one floating burner.

23. The system of claim 13, wherein the captured fluid comprises at least 80 volume percent hydrocarbons.

24. The system of claim 13, further comprising at least one heat exchanger configured to heat the captured fluid.

* * * * *